United States Patent [19]
Johno

[11] Patent Number: 6,056,534
[45] Date of Patent: May 2, 2000

[54] MOLD FOR SHAPING A SKIN SHEET

[75] Inventor: Masahiro Johno, Omiya, Japan

[73] Assignee: Kansei Corporation, Omiya, Japan

[21] Appl. No.: 09/045,676

[22] Filed: Mar. 23, 1998

[30] Foreign Application Priority Data

Mar. 21, 1997 [JP] Japan ................................ 9-068076

[51] Int. Cl.[7] .................................................. B29C 51/36
[52] U.S. Cl. .......................................... 425/388; 425/403
[58] Field of Search ........................... 425/388, DIG. 60, 425/403, 112

[56] References Cited

U.S. PATENT DOCUMENTS 3,960,471  6/1976  Medendorp ............................. 425/388

*Primary Examiner*—Harold Pyon
*Assistant Examiner*—Mark A. Wentink
*Attorney, Agent, or Firm*—Jacobson, Price, Holman & Stern, PLLC

[57] ABSTRACT

A mold for shaping a skin sheet has a three-dimensional body including a top surface and side surfaces that work as a shaping surface, respectively. The top surface and the side surfaces have a plurality of small holes communicating with a suction unit for drawing the skin sheet thereon by suction force generated by the suction unit. Each of the side surfaces has a product portion and a non-product portion parted at a trimming line, the portions corresponding to those of the skin sheet that are used as a product and not used as the product, respectively. The body has a plurality of guidance plates, each projecting outside at an edge line of the body. An upper edge of each of the guidance plates forms a ridge line in a shape of a wave. The ridge line descends from a position in the vicinity of an intersection point of the edge line and the trimming line to a direction of the bottom of the body so as to form a valley and thereafter ascends to an opposite direction so as to form a mountain. The height of the deepest point of the valley is lower than that of the trimming line.

3 Claims, 5 Drawing Sheets

Perspective View

Perspective View

MOLD FOR SHAPING A SKIN SHEET

BACKGROUND OF THE INVENTION

1. Field of the Invention

This invention relates to a mold for shaping a skin sheet made of thermoplastic resin such that the skin sheet is heated and softened and thereafter is drawn onto the shaping surfaces of the mold by vacuum, and relates to a method of shaping the same.

2. Description of the Prior Art

A conventional mold for shaping a skin sheet is known as shown in FIGS. 4 and 5.

FIG. 4 is a perspective view of a conventional skin-shaping mold, and FIG. 5 is a descriptive drawing showing a state in which the skin shaped by the skin shaping mold is set in a foaming mold while a foaming process is continuing.

As shown in FIG. 4, the mold 2 comprises a shaping surface 2a and a base surface 2e which are united with each other by means of wood screws, an adhesive agent, and the like.

The mold 2 also has edge line portions 2b at which adjoining side-surfaces intersect. During the skin shaping, an excess skin on the adjoining side surfaces gathers and layers at the edge line portion 2b. However, it is difficult to always obtain a desired molding because different shapes are given to the skin sheet at the edge line portion 2b whenever shaping is performed.

Therefore, the mold 2 is provided with guidance plates 3 of a substantially triangular shape. The triangular guidance plate 3, one side of which is the edge line 2b, is fixed into the base surface 2e in a predetermined direction.

As a result, an excess skin on the adjoining side surfaces is guided to the guidance plate 3 to intentionally form a gathering 6 (in general, called bridge) into which the excess skin is absorbed.

As shown in FIG. 4, a molding (i.e., shaped skin) 4 is obtained by this mold 2 provided with the guidance plates 3 through the following steps. A skin sheet 1 is first heated and softened, and then is moved down toward the mold 2 and is pushed against the mold 2. At the same time, air is drawn out in a moment through small holes 2f formed in the mold 2, and thus the skin sheet 1 is sucked and stuck onto the shaping surface 2a. A surplus of the skin sheet 1 is absorbed into the guidance plate 3, and is formed as the bridge 6. This shaped skin 4 is cooled while keeping its shape, and is stripped from the mold 2 to obtain a finished molding.

After that, foaming is performed using the shaped skin 4 provided with the bridges 6. As shown in FIG. 5, a hollow portion 7a into which the bridge 6 can be inserted is formed in a cavity mold 7. With the bridge 6 inserted in the hollow portion 7a, the shaped skin 4 is pushed and spread to be set on the inner surface of the cavity mold 7.

Thereafter, a predetermined quantity of foaming material 13 is poured into the cavity mold 7 through a mixing head 11 which has been moved over the cavity mold 7, and then a core mold 8 is moved down in a direction of arrow P to create a closing state together with the cavity mold 7.

In a closed foaming mold 12, the foaming material 13 produces a chemical reaction, and cellularly foams and expands. As a result, the foaming mold 12 is filled with the foaming material 13, and thereby a core material 9 and the shaped skin 4 are caused to adhere to each other to form an integral product.

However, the bridge 6 of the shaped skin 4 is still left without changing the form of the bridge 6 which has been given by the guidance plate 3 during the skin shaping, and is inserted in the hollow portion 7a of the cavity mold 7. If foaming is performed using the shaped skin or with the thus formed bridge 6, the foaming material 13 flows into a gap in the bridge 6 because of foaming pressure, and leaks out of the product.

For this reason, there is a fear that a shortage in quantity of the foaming material 13 will be caused and make a thin appearance of the product, or foamed cells will not become uniform because the internal pressure of the foaming mold 12 does not increase. Accordingly, the elasticity of the foaming material 13 will not become uniform either. These make it impossible to stably produce a product superior in quality.

In order to solve this problem, when the aped skin 4 is set in the cavity mold 7, a seal tape 5 is stuck on the gap in the bridge 6 so as to prevent the foaming material 13 from flowing into the gap and leaking out of the product.

Therefore, the seal tape 5 and tape sticking operations are required to prevent the disadvantage. This causes an increase in production costs.

SUMMARY OF THE INVENTION

An object of the present invention is, therefore, to provide a mold for shaping a skin sheet which is capable of forming a shaped skin without any seal tape used to prevent a leakage of foaming material.

The present invention is characterized in that, in a mold for shaping a skin sheet made of thermoplastic resin, the mold comprising shaping surfaces of a three-dimensional body each of which comprises a product portion used to form a product and a non-product portion other than the product portion, wherein the skin sheet is heated and softened and thereafter is drawn onto the shaping surfaces by a vacuum so as to come into contact with the shaping surfaces, the mold further comprises guidance plates each of which is erected on both of the product portion and the non-product portion of an edge line at which the adjoining shaping surfaces intersect, and the guidance plate has a ridge line extending from a top of the edge line in a direction to recede from the top thereof. The ridge line is formed in the shape of a wave when viewed from the side such that the ridge line descends from the top of the edge line to a side of the non-product portion so as to form a valley and thereafter ascends to a side of the product portion so as to form a mountain, and the skin sheet is shaped while guiding parts of the skin sheet by means of the guidance plate provided with the wavy ridge line and maintaining tension of the parts thereof.

According to this construction, when skin shaping is performed, parts of the skin sheet which have been heated and softened are stretched at tension on the mountain of the guidance plate, whereas parts of the skin sheet which have been heated and softened come into contact with each other in the valley of the guidance plate near to the top of the edge line of the adjoining shaping surfaces. Thus, in the valley, the parts of the softened skin sheet are unified, and therefore the resultant shaped skin does not have gaps which a foaming material invades during the foaming.

Preferably, the guidance plate is a thin plate. A thin guidance plate makes it possible to securely unify parts of the softened skin sheet used for a bridge and reduce wide variations in shape of the bridge. Additionally, the thin guidance plate facilitates the insertion of the bridge into a hollow portion of the foaming mold because the bridge consisting of two layers is thinned and therefore becomes more rigid.

Preferably, the guidance plate is a metal plate. A metallic guidance plate will not be deformed or broken even when vacuum forming is intensely performed, because the strength of the metallic guidance plate is maintained even if it is thinned.

Further, the present invention is characterized in that a plurality of small holes communicating with a suction unit are formed in the shaping surfaces of the mold and in a base portion of the guidance plate. According to this construction, strong vacuum forming is performed. Therefore, the bridge can always have a fixed shape, and a skin fusion portion can be formed with great reliance.

Further, the present invention is characterized by a skin shaping method which includes the steps of drawing a skin sheet which has been heated and softened toward a mold provided with a guidance plate by a vacuum, the guidance plate having a wavy ridge line, when viewed from the side, which descends from a top of an edge line at which adjoining shaping surfaces of the mold intersect toward a side of a non-product portion of the shaping surface so as to form a valley and thereafter ascends to a side of a product portion of the shaping surface so as to form a mountain; guiding parts of the skin sheet by means of the guidance plate; drawing out air through small holes formed in a base portion of the guidance plate while maintaining tension of the parts of the skin sheet; and accumulating and unifying the parts of the skin sheet in the valley of the guidance plate next to the top of the edge line.

According to this method, simply by performing the vacuum forming while allowing the skin sheet to face the mold, the resultant bridges can each have a skin fusion portion without a gap. Therefore, a product can be obtained without using a seal tape and without allowing the foaming material to enter the bridge when foaming is performed using the skin sheet which has been shaped by the mold according to the present invention.

DETAILED DESCRIPTION OF THE PREFERRED EMBODIMENTS

An embodiment of the present invention will be described with reference to FIGS. 1 to 3. In this embodiment, the same numerals are each given to the same or equivalent constituent parts as those of the aforementioned conventional mold.

Figure 1:
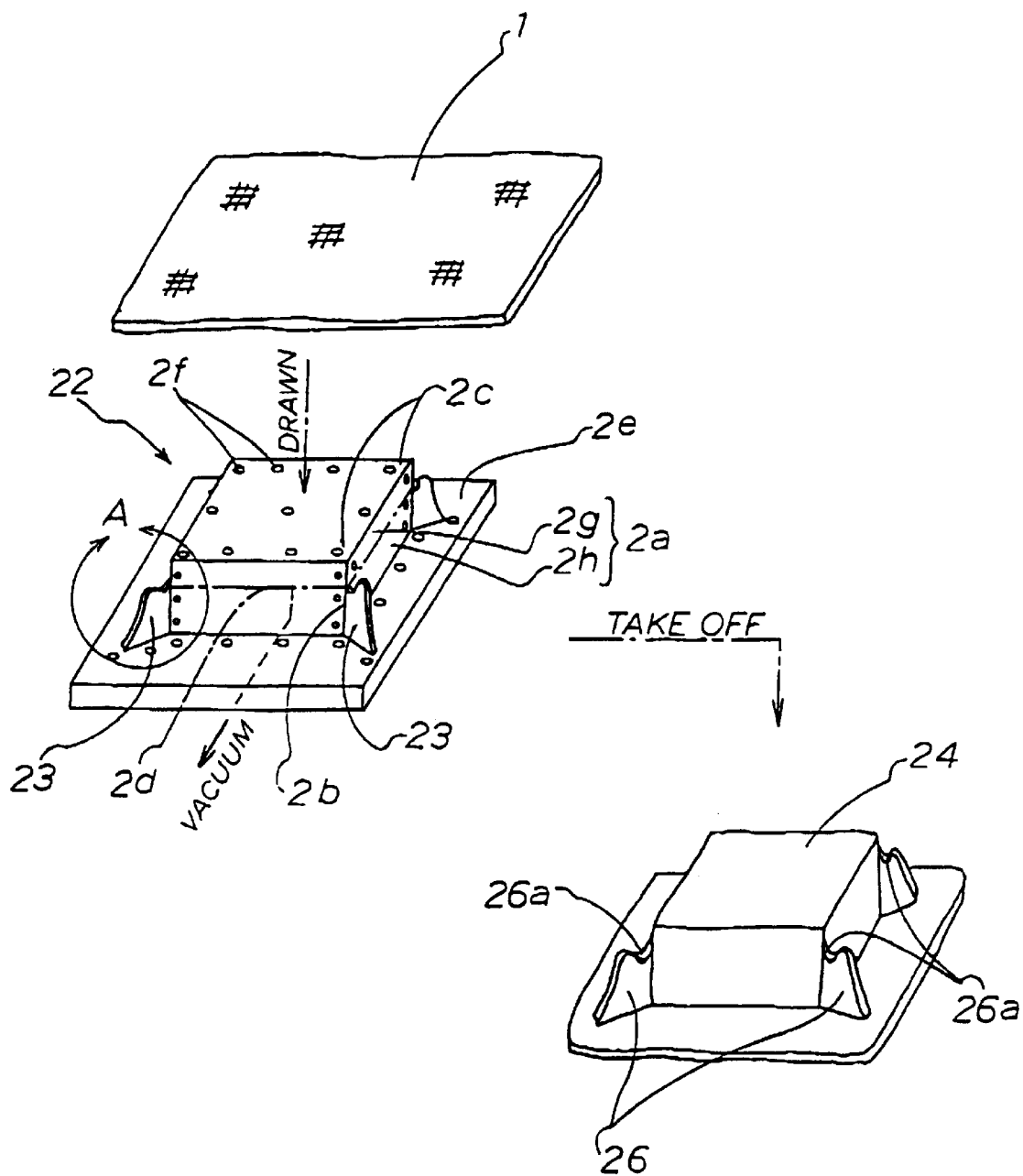
FIG. 1 is a perspective view of a skin shaping mold according to the present invention and a shaped skin stripped from the mold, and showing a method of shaping a skin sheet.

FIG. 1 depicts a skin, a skin shaping mold, and a shaped skin. A description will be given of the skin shaping mold as well as the shaped skin formed by the skin shaping mold.

In FIG. 1, reference character 1 designates a skin sheet, reference character 22 designates a skin shaping mold, and reference character 2a designates a shaping surface of the skin shaping mold 22. The shaping surface 2a consists of a product portion 2g enclosed by a trimming line 2d of an alternate long and short dash line the product portion 2g corresponding to a first portion of the skin sheet 1 that is used as a product, and a non-product portion 2h outside the product portion 2g, the non-product portion 2h corresponding to a second portion of the skin sheet 1 that is not used as the product.

Additionally, reference character 2b designates an edge line at which two adjoining shaping surfaces 2a intersect; 2c designates a top portion of the edge line 2b; 2d designates the trimming line, as mentioned above, which corresponds to the boundary line of the product portion 2g on the shaping surface 2a; 2e designates a base surface of the skin shaping mold 22; 2f designates small holes for suction, formed in the shaping surfaces 2a and in the base surface 2e; and 23 designates a thin guidance plate made of, for example, aluminum.

Additionally, reference character 24 designates a shaped skin formed by the skin shaping mold 22, and reference character 26 designates a bridge formed by the guidance plate 23 during the skin shaping.

Figure 2A:
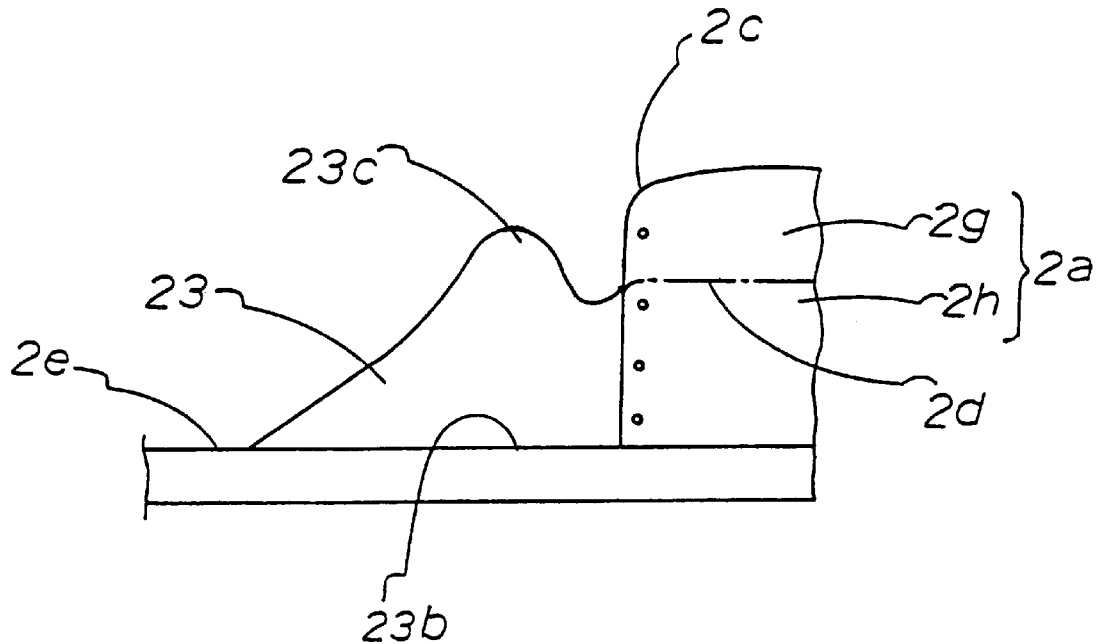
FIG. 2(a) is a side view of a guidance plate, showing part A of FIG. 1, viewed from a direction of arrow B of FIG. 2(b).
Figure 2B:
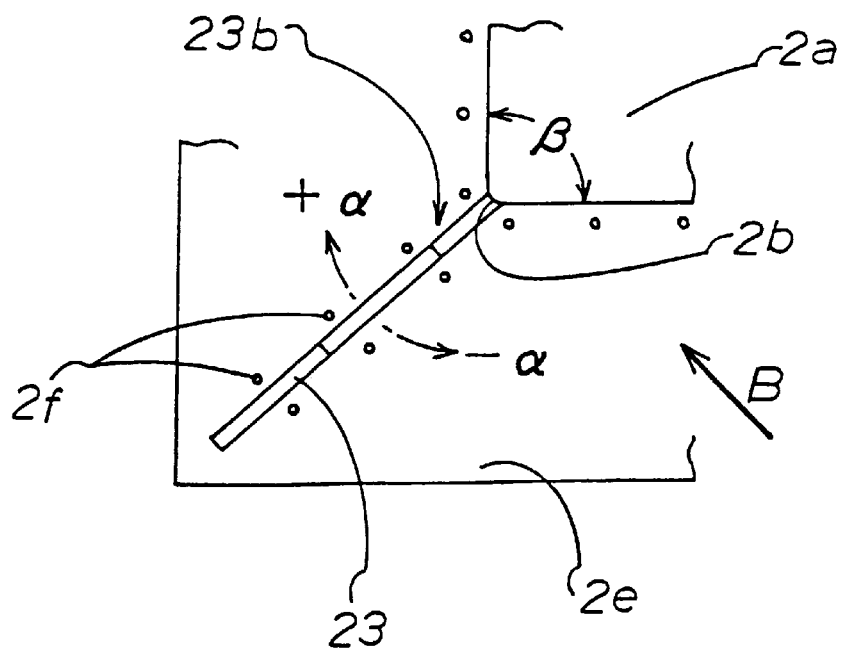
FIG. 2(b) is a top plan view of part A of FIG. 1.

FIG. 2(a) is a side view of the guidance plate of the skin shaping mold, showing part A of FIG. 1 (viewed from a direction of arrow B in FIG. 2(b)). In FIG. 2(a), the ridge line 23c, when viewed from the side, goes down from a position in the vicinity of the left side end position of the trimming line 2d, toward the non-product portion side 2h so as to have a concave (i.e., a valley), the height of the deepest position of the valley being lower than the height of the trimming line 2d, and thereafter goes up toward the product portion side 2g so as to have a convex (i.e., a mountain), so that a wavy guidance plate 23 is constructed.

FIG. 2(b) is a top plan view of the guidance plate of the skin shaping mold, showing part A of FIG. 1. In FIG. 2(b), the guidance plate 23, when viewed from the top, is fixed at a predetermined angle on the edge line 2b of the shaping surfaces 2a and the base surface 2e.

Herein, the predetermined angle is determined by rotating the guidance plate 23 around the edge line 2b as shown in FIG. 2(b). Since the quantity or direction of the excess skin varies with the shape of the shaping surface 2a or the angle β between two adjoining surfaces thereof, the most desirable angle around the edge line 2b to attach the guidance plate 23 is selected by "trial and error" of an angle of ±α.

Accordingly, in the skin shaping mold 22 of FIGS. 1 to 2(b), the excess skin can be absorbed by forming the bridge 26 on purpose, and also a skin fusion portion 26a can be formed into a predetermined shape in a predetermined position.

Figure 3A:
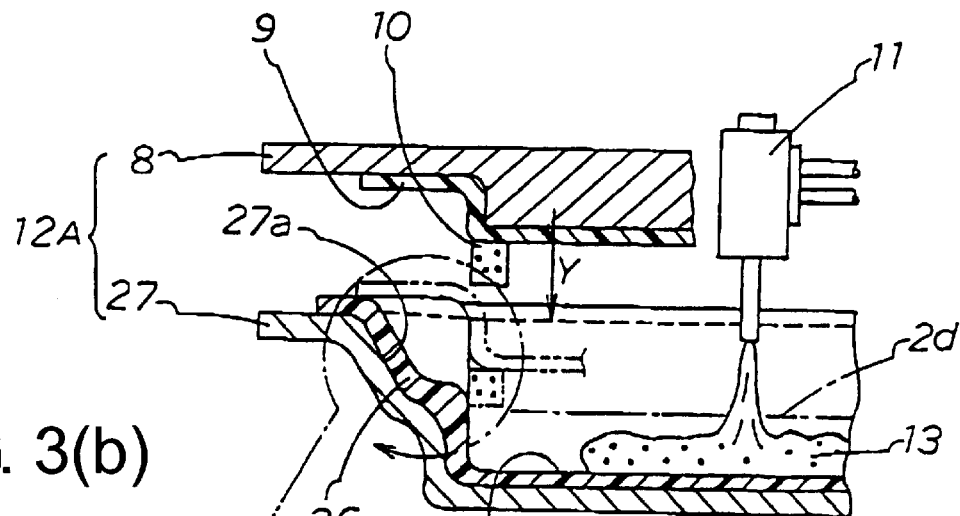
FIG. 3 is a descriptive drawing showing a state in which foaming is performed while setting the skin shaped by the mold of FIG. 1 in a foaming mold.
Figure 3B:
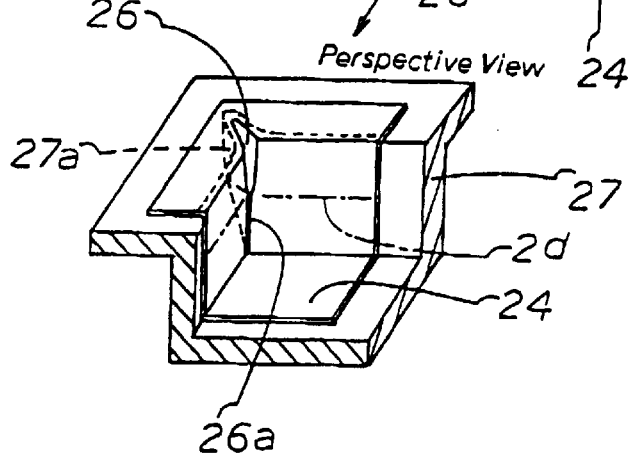
Figure 4:
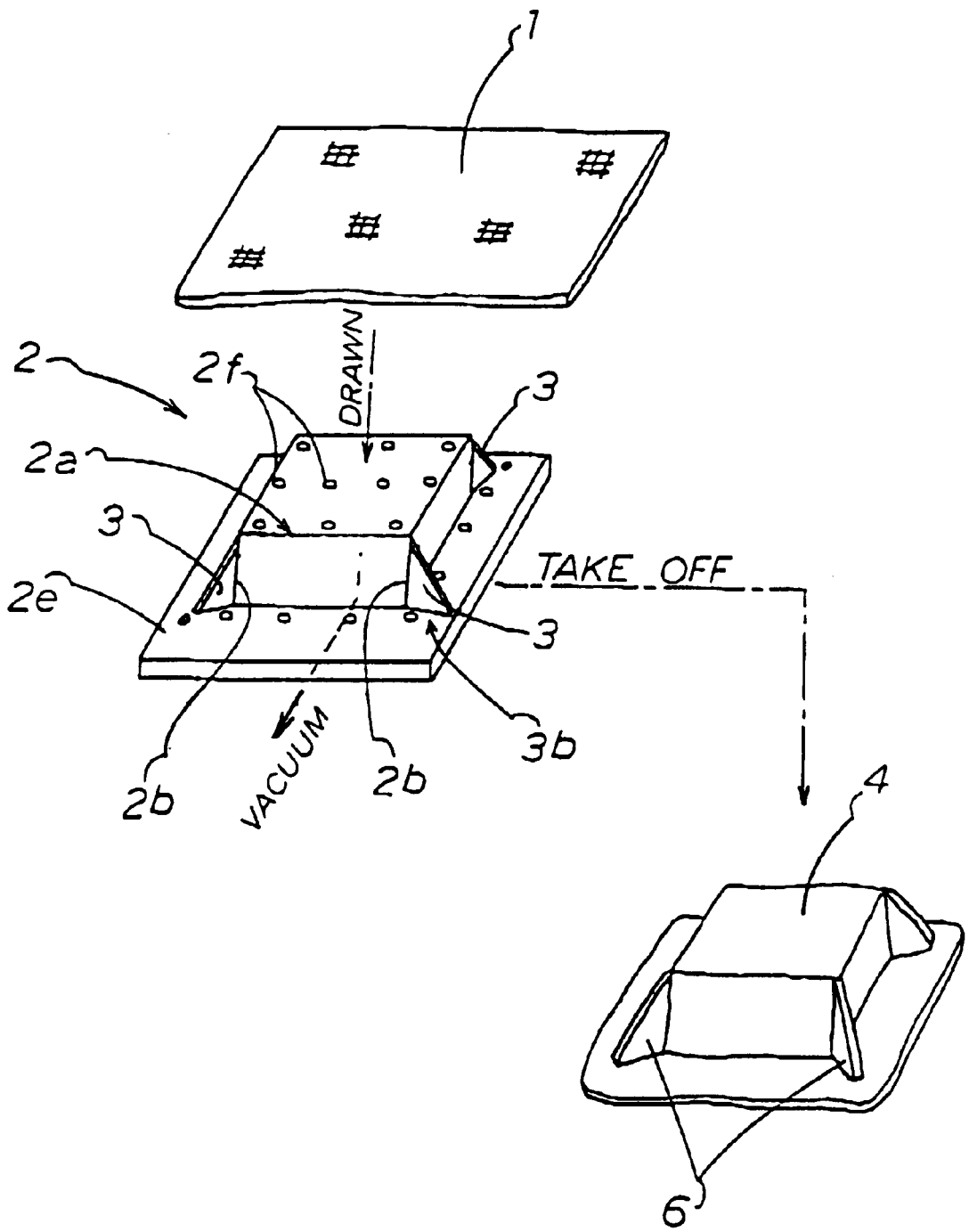
FIG. 4 is a perspective view of a conventional skin-shaping mold and a shaped skin stripped from the conventional mold.

FIG. 3 is a descriptive drawing showing a state in which foaming is being performed while setting a shaped skin in a foaming mold. In FIG. 3, reference character 12A designates the foaming mold which consists of a core mold 8 and a cavity mold 27. The shaped skin 24 is extended and disposed on the inner surface of the cavity mold 27. Reference character 27a designates a hollow portion into which the bridge 26 of the shaped skin 24 is inserted.

Figure 5A:
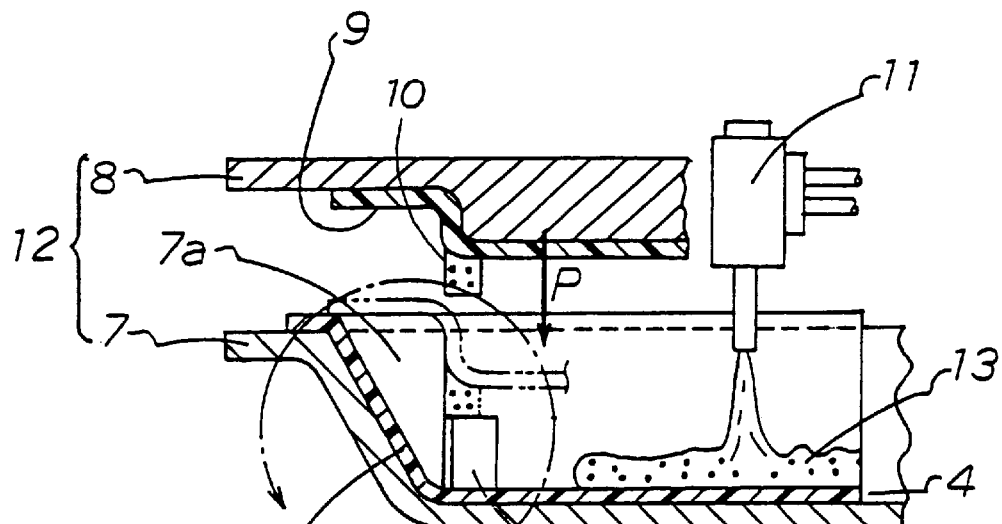
FIG. 5 is a descriptive drawing showing a state in which foaming is performed while setting the shaped skin formed by the conventional mold of FIG. 4.
Figure 5B:
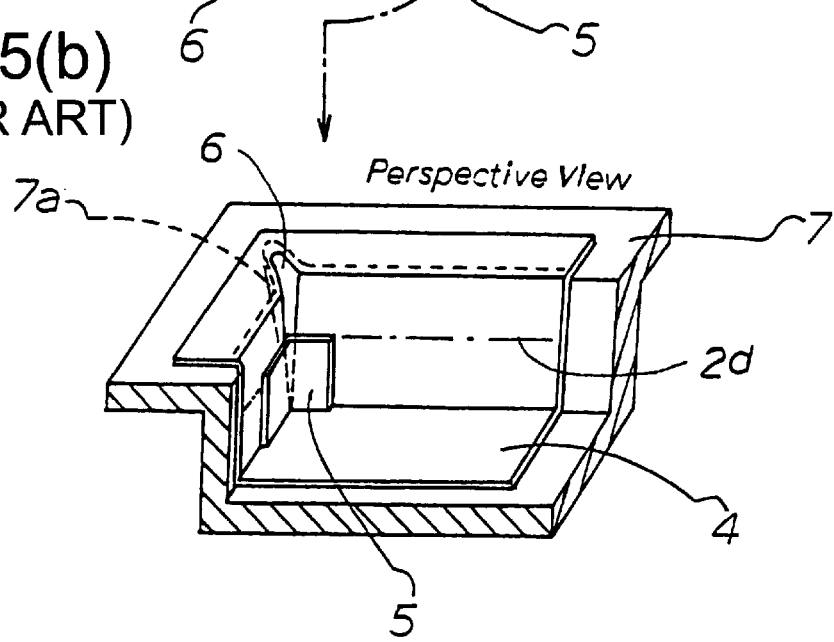

In the perspective view of the concave portion 27a of FIG. 3, since a part (shown by a thick line in FIG. 3) of the bridge 26 which has been inserted in the hollow portion 27a is unitedly formed as a skin fusion portion 26a, the bridge 26 does not have any gap which the foaming material 13 invades. As a result, the shaped skin 24 can be set in the foaming mold 12A without the seal tape 5 (see FIG. 5) which was conventionally required.

On the other hand, the bridge 26 formed by the mountain of the guidance plate 23 does not have a united fusion portion (in other words, has a gap). Therefore, when the foaming mold 12A is closed by moving the core mold 8 in the direction of arrow Y to be coupled with the cavity mold 27, one side surface of a sealing member 10 stuck onto a core material 9 which has been detachably attached to the core mold 8 is brought into contact with the bridge 26 so as to close the gap of the bridge 26.

A description will now be given of a skin shaping process, which is performed using the skin shaping mold 22 constructed as above, and a foaming process.

First, the skin shaping will be described. As shown in FIG. 1, the skin sheet 1 which has been heated and softened is pushed against the shaping surface 2a of the skin shaping mold 22 and is drawn to the shaping surface 2a by a vacuum which is produced by instantaneously taking out air through the small holes 2f in connection with a suction unit (not shown). As a result, the skin sheet 1 sticks fast to the skin shaping mold 22.

At this time, the stuck skin 1 is stretched and tensed at the guidance plate 23 of the skin shaping mold 22, particularly at the mountain of the ridge line 23c of the guidance plate 23 and, as a result, the bridge 26 is formed.

The guidance plate 23 also has a valley between the mountain and the top portion 2c. At this valley, the skin 1 is tugged between the mountain and the top portion 2c, as if to be a suspension bridge, by the suction force through the small holes 2f formed in a base portion 23b of the guidance plate 23. Thus, parts of the softened skin 1 are allowed to face each other at the valley, and are unified to be the skin fusion portion 26a.

Thereafter, the shaped skin is cooled by spray water and air while keeping its shape, and is stripped from the mold to obtain the shaped skin 24.

In this embodiment, the conventional vacuum-forming method is principally used to obtain a shaped skin. Instead, a pressure/vacuum forming method may be used which is a combination of the vacuum forming method and a pressure forming method.

Next, a description will be given of foaming which is performed using the shaped skin 24.

FIG. 3 shows a state in which the shaped skin is set in a cavity mold while pouring a foaming material thereinto.

In FIG. 3, the whole of the shaped skin 24 is extended on the inner surface of the foaming mold 12A, with the bridge 26 inserted in the hollow portion 27a of the cavity mold 27. The hollow portion 27a is shaped to the bridge 26.

The foaming material 13 consisting of two kinds of liquid (liquid A and liquid B) is poured from a mixing head 11 onto the shaped skin 24 situated in the cavity mold 27 by a predetermined quantity of liquid while agitating the two kinds of liquid in the nixing head 11. And immediately, the foaming mold 12A is closed by moving down the core mold 8 in the direction of arrow Y to be coupled with the cavity mold 27.

Thereafter, in the closed foaming mold 12A, the poured foaming material 13 produces a rapid reaction, and increases its volume. As a result, the foaming mold 12A is filled with the foaming material 13 and, at the same time, with the foaming pressure. A gap of the bridge 26 other than the skin fusion portion 26a is closed with the sealing member 10. Therefore, foaming is performed without the seal tape 5. Additionally, in the foaming mold 12A which has been filled with the foaming material 13, the core material 9 and the shaped skin 24 are caused to adhere to each other by the medium of the foaming material 13. As a result, a product in which these three layers have been united can be obtained.

As can be seen from the foregoing description, if use is made of the shaped skin 24 with the skin fusion portion 26a intentionally formed in the bridge 26, there is no fear that the foaming material 13 will leak out during the foaming. Therefore, the seal tape 5 and seal sticking operations are not required (see FIG. 5). This leads to a reduction in production costs.

In this embodiment, the skin is made of resin material produced by mixing ABC resin with vinyl chloride, and is shaped into a sheet by means of an extruder or a calendering roll. In many cases, the right surface of the resin material receives the embossing treatment to obtain a good appearance.

Further, for various interior goods of a vehicle, use is made of a skin with a thickness of 0.7 mm or 0.8 mm formed under the vacuum forming method or similar method.

In this embodiment, the foaming material 13 is urethane foaming material Polyol used as liquid A and isocyanate used as liquid B are agitated and mixed in the mixing head 11, and are poured into the foaming mold 12A, and thereby produce a chemical reaction for foaming. The foaming material 13 consisting of the two kinds of liquid has a property of producing a rapid and strong reaction and rapidly increasing its volume to heighten the inner pressure of the foaming mold 12A. Therefore, the foaming material 13 can invade a narrow gap.

Further, in general, the sealing member 10 used in this embodiment is obtained by slicing a foamed body having urethane closed-cells into strings circular or rectangular in section. The sealing member 10 made of foamed material is soft and elastic, and therefore can easily adhere to an uneven surface.

Further, in a case where there is no gap when the molds are closed, the sealing member 10 is used in a state of being squashed. On the other hand, in a case where there are gaps, the elastic sealing member 10 closes the gaps in a state of being sufficiently expanded in the gaps, using its own elasticity. As a result, the sealing member 10 having the closed cells can block the invasion of the foaming material 13 without absorbing the foaming material 13, and therefore the foaming material 13 can be prevented from leaking out of the product.

What is claimed is:

1. A mold for shaping a skin sheet made from thermoplastic resin, said mold comprising:

a three-dimensional body, a top surface and side surfaces of which work as a shaping surface, respectively, and have a plurality of small holes communicating with a suction unit for drawing said skin sheet in a state of being heated and softened thereon by suction force generated by the suction unit so that said skin sheet comes into contact with them, each of said side surfaces having a product portion and a non-product portion parted at a trimming line, the product portion corresponding to a first portion of said skin sheet that is used as a product, the non-product portion corresponding to a second portion of said skin sheet that is not used as the product; and a plurality of guidance plates, each projecting outside at an edge line of said body, at which adjoining ones of said side surfaces intersect, an upper edge of each of said guidance plates forming a ridge line in a shape of a wave, when viewed from a side of said guidance plate, such that said ridge line descends from a position in the vicinity of an intersection point of the edge line and the trimming line to a direction of a bottom of said body so as to form a valley and thereafter ascends to an opposite direction so as to form a mountain, a height of the deepest point of the valley being lower than that of the trimming line.

2. A mold for shaping a skin sheet according to claim 1, wherein said guidance plate is a thin plate.

3. A mold for shaping a skin sheet according to claim 1, wherein said guidance plate is a metal plate.

* * * * *